(12) United States Patent
Park et al.

(10) Patent No.: US 9,250,836 B2
(45) Date of Patent: Feb. 2, 2016

(54) MOBILE APPARATUS AND PRINT CONTROLLING METHOD

(75) Inventors: Jeong-Jin Park, Seoul (KR); Jae-young Soh, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 96 days.

(21) Appl. No.: 13/464,308

(22) Filed: May 4, 2012

(65) Prior Publication Data

US 2013/0100463 A1 Apr. 25, 2013

(30) Foreign Application Priority Data

Oct. 21, 2011 (KR) .......................... 10-2011-0108338

(51) Int. Cl.
*G06K 15/02* (2006.01)
*G06F 3/12* (2006.01)

(52) U.S. Cl.
CPC ............ *G06F 3/1211* (2013.01); *G06F 3/1228* (2013.01); *G06F 3/1247* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2010/0045772 A1* | 2/2010 | Roo et al. | 348/14.01 |
| 2010/0073693 A1* | 3/2010 | Lee et al. | 358/1.2 |
| 2010/0195134 A1* | 8/2010 | Miyata | 358/1.14 |
| 2010/0223571 A1* | 9/2010 | Krete | 715/776 |
| 2011/0194127 A1* | 8/2011 | Nagakoshi et al. | 358/1.9 |
| 2011/0221766 A1* | 9/2011 | Ko et al. | 345/629 |
| 2012/0010920 A1* | 1/2012 | Yuan | 705/7.29 |
| 2012/0010995 A1* | 1/2012 | Skirpa et al. | 705/14.49 |
| 2012/0084835 A1* | 4/2012 | Thomas et al. | 726/3 |
| 2012/0184289 A1* | 7/2012 | Wang et al. | 455/456.1 |
| 2013/0143651 A1* | 6/2013 | Harrison et al. | 463/31 |

FOREIGN PATENT DOCUMENTS

WO 2010/107036 9/2010

OTHER PUBLICATIONS

Extended European Search Report dated Nov. 7, 2013 in European Patent Application No. 12183066.5.

* cited by examiner

*Primary Examiner* — Helen Q Zong
(74) *Attorney, Agent, or Firm* — Staas & Halsey LLP

(57) ABSTRACT

A mobile apparatus is disclosed. The mobile apparatus includes a user interface unit which is selected with a web page to be printed, an obtaining unit which obtains a size of the selected web page, a calculating unit which calculates a plurality of capture areas regarding the web page based on the obtained size of the web page so that there is not repeated area, an image processing unit which generates a capture image regarding the web page per calculated plurality of capture area, and combines the generated capture images to generate a print image, and a communication interface unit which transmits the generated print image to the image forming apparatus.

21 Claims, 10 Drawing Sheets

| Mobile Browser | Default viewport width |
|---|---|
| Opera Mobile | 850 pixels |
| iPhone Safari | 980 pixels |
| Android | 800 pixels |
| Windows Phone 7 | 1024 pixels |

MOBILE APPARATUS AND PRINT CONTROLLING METHOD

CROSS-REFERENCE TO RELATED APPLICATIONS

This application claims priority benefit from Korean Patent Application No. 2011-0108338, filed in the Korean Intellectual Property Office on Oct. 21, 2011, the disclosure of which is incorporated herein by reference.

BACKGROUND

1. Field

Embodiments relate to a mobile apparatus and print controlling method, and more particularly, to a mobile apparatus for printing a webpage in an image capture method and a print controlling method having the same.

2. Description of the Related Art

In general, an image forming apparatus refers to an apparatus which prints print data generated in a terminal such as a computer on recording paper. A copier, printer, facsimile, and multi function peripheral (MFP) which embodies multi functions of a copier, printer, and facsimile in one apparatus are examples of such an image forming apparatus.

Nowadays, as it is possible to connect to the internet in a mobile apparatus such as a mobile phone, PMP, and MP3 player, it also became possible to perform a printing operation of a webpage in a mobile apparatus. However, since a printer driver is not installed in a mobile apparatus unlike in a print controlling terminal such as a PC, in a mobile apparatus, a printing operation is performed by generating a plurality of capture images of a webpage, combining the generated capture images, and transmitting the combined images to the image forming apparatus.

More specifically, an image is generated by capturing a portion of a webpage while scrolling the webpage by portions using a capture API inside a browser installed in a mobile apparatus, cutting out repetitive areas among a plurality of captured images, and then combining them.

However, this conventional method takes a long time due to the process of cutting out repetitive areas among the plurality of captured images.

In addition, the capturing process also takes a long time since capturing a webpage depends on whether or not scrolling is possible. Moreover, in the conventional method, printing operation itself is not possible in a browser which does not have a capture API.

SUMMARY

An aspect of embodiments relates to a mobile apparatus for printing a web page in an image capture method and a print controlling method having the same.

According one or more embodiments, there is provided a mobile apparatus connectible to an image forming apparatus and internet may include a user interface unit which is selected with a web page to be printed; a size obtaining unit which obtains a size of the selected web page; a calculating unit which calculates a plurality of capture areas regarding the web page in such a manner that there is no repeated area, based on the obtained size of the web page; an image processing unit which generates a capture image regarding the web page per calculated plurality of capture areas, and combines the generated capture images to generate a print image; and a communication interface unit which transmits the generated print image to the image forming apparatus.

The size obtaining unit may obtain a size of the web page using a size calculation API (Application Programming Interface) of a web browser which displays the web page.

The size obtaining unit may obtain a size of the selected web page using a Javascript function.

The calculating unit may divide the web page into a plurality of capture areas by a predetermined capture size in such as manner that there is not repeated area, and calculate x, y coordinates per divided capture area.

The predetermined capture size may be a size of the web page which can be displayed in the user interface unit in the case of displaying the web page without any expansion.

The image processing unit may control so that the calculated plurality of capture areas are displayed consecutively on the user interface unit, and generate a screen displayed consecutively as a capture image.

The image processing unit may control so that the plurality of capture areas are displayed consecutively on the user interface unit using the Javascript function, to generate a plurality of capture images.

The image processing unit may combine the generated plurality of capture images to correspond to the capture area, and cut out an area which does not correspond to the size of the web page, to generate a print image.

The user interface unit may receive information of a size of a paper where the print image is to be printed, and the image processing unit may perform at least one processing from among an expansion processing, reduction processing, and dividing processing on the combined capture image according to the received size of the paper, to generate a print image.

The user interface unit may display the generated print image.

According to one or more embodiments, there is provided a print controlling method in a mobile apparatus connectible to an image forming apparatus and internet may include being selected a web page to be printed; obtaining a size of the selected web page; calculating a plurality of capture areas regarding the web page so that there is no repeated area, based on the obtained size of the web page; generating a capture image regarding the web page per calculated plurality of capture areas; combining the generated capture images to generate a print image; and transmitting the generated print image to the image forming apparatus.

The obtaining the size may obtain a size of the web page using a size calculation API (Application Programming Interface) of a web browser which displays the web page.

The obtaining the size may obtain a size of the selected web page using a Javascript function.

The calculating may divide the web page into a plurality of capture areas by a predetermined capture size in such a manner that there is no repeated area, and calculate x, y coordinates per divided capture area.

The predetermined capture size may be a size of a web page area which can be displayed in the user interface unit in the case of displaying the web page without any expansion.

The generating the capture image may control so that the calculated plurality of capture areas are displayed consecutively on the user interface unit, and generates a screen displayed consecutively as a capture image.

The generating the capture image may control so that the plurality of capture areas are displayed consecutively on the user interface unit using the Javascript function to generate a plurality of capture images.

The generating the print image may combine the generated plurality of capture images to correspond to the capture area, and cut out an area that does not correspond to the size of the web page, to generate a print image.

The print controlling method may further include receiving information of a size of a paper where the print image is to be printed, and the generating the print image may perform at least one processing from among an expansion processing, reduction processing, and dividing processing on the combined capture image according to the size of the paper to generate a print image.

The print controlling method may further include displaying the generated print image.

BRIEF DESCRIPTION OF THE DRAWINGS

The above and/or other aspects of embodiments will be more apparent by describing embodiments with reference to the accompanying drawings, in which.

DETAILED DESCRIPTION

Figures 1, 2:
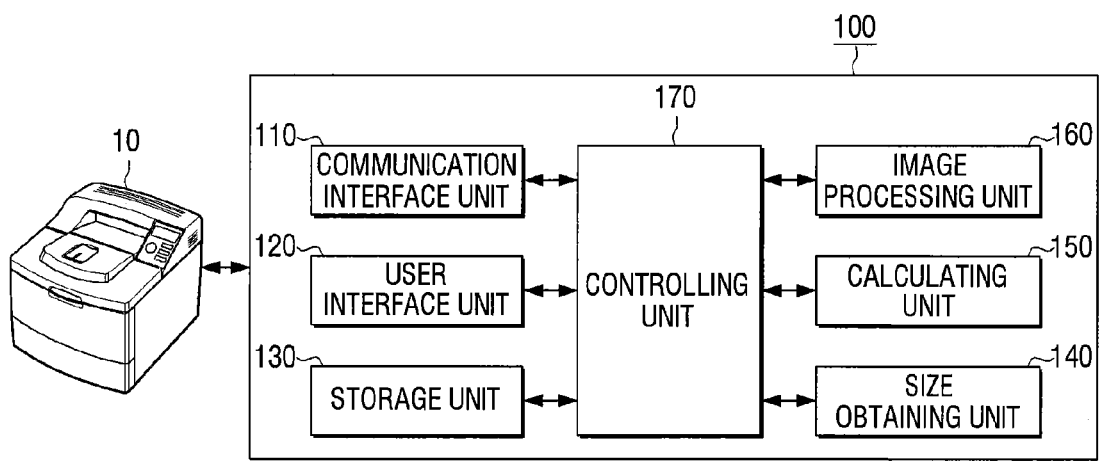
FIG. 1 is a block diagram illustrating a configuration of a mobile apparatus according to an embodiment.
FIG. 2 is a view illustrating a default viewport value per web browser.

Reference will now be made in detail to embodiments, examples of which are illustrated in the accompanying drawings, wherein like reference numerals refer to like elements throughout. Embodiments are described below by referring to the figures.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of a mobile apparatus according to an embodiment.

With reference to FIG. 1, the mobile apparatus 100 may consist of a communication interface unit (communication interface) 110, a user interface unit (user interface) 120, a storage unit 130, a size obtaining unit 140, a calculating unit (a calculator) 150, an image processing unit (image processor) 160, and a controlling unit (a controller) 170. Such a mobile apparatus 100 includes a mobile phone, portable media player (PMP), and MP3 player.

The communication interface unit 110 is formed to connect the mobile apparatus 100 with an external apparatus, is connected to an image forming apparatus (10) through Local Area Network (LAN), the Internet network and wireless communication systems such as global system for mobile communication (GSM), universal mobile telephone system (UMTS), and long term evolution (LTE).

The communication interface unit 110 may receive a web page through the internet.

In addition, the communication interface 110 may transmit a print image to the image forming apparatus 10. More specifically, the communication interface 110 may transmit the print image generated in an image processing unit 160 to be explained hereinbelow to the image forming apparatus 10.

The user interface unit 120 has a plurality of function keys through which a user may set or select various functions that the mobile apparatus 100 supports, and displays various information that the mobile apparatus 100 provides. The user interface 120 may be embodied as an apparatus where input and output are embodied simultaneously such as a touch pad, and may be embodied as an apparatus through combination of a mouse and a monitor.

The user interface unit 120 displays a web page. More specifically, the user interface unit 120 may display a web page received through the communication interface unit 110 according to a control of a web browser installed in the mobile apparatus 100. Herein, the user interface unit 120 may expand/reduce and then display the web page according to a control of the user or the web browser. More specifically, the web browser installed in the mobile apparatus 100 stores a screen to be displayed in the user interface unit 120 to a display data buffer. Therefore, the user interface unit 120 may obtain information stored in the display data buffer and display the web page.

The user interface unit 120 is selected with a web page to be printed. More specifically, the user may post a web page address to be printed on a user interface window displayed on the user interface unit 120, and select the web page to be printed. In addition, the user may input a print command regarding the displayed web page through the web browser and select the web page to be printed.

In addition, the user interface unit 120 may receive information on a size of a paper where the print image is to be printed. More specifically, the user interface 120 may receive information on a size of a paper where print image is to be printed (for example, A4, B5, or width length/height length of the print paper).

In addition, the user interface unit 120 may set a layout of a print image. More specifically, the user may set expansion/reduction of the print image, location on the print paper on the user interface window provided in the user interface unit.

In addition, the user interface unit 120 may display a preview regarding the generated print image. More specifically, the user interface unit 120 may display the print image generated in the processing unit 160 to be explained hereinbelow as a preview. The user may check the displayed preview image and determine whether or not to proceed with the print operation.

The storage unit 130 may include a display data buffer. Herein, the display data buffer is a configuration of a web browser temporarily storing a screen to be displayed on the user interface unit 120, and the user interface unit 120 may display the web page using the information stored in the display data buffer, and the image processing unit 160 to be explained hereinbelow may obtain the information stored in the display data buffer and generate the capture image.

The storage unit 130 may store the capture image. More specifically, the storage unit 130 may store the screen displayed on the user interface unit 120 as the capture image.

In addition, the storage unit 130 may store the combined capture image. More specifically, the storage unit 130 may store the combined capture image regarding the plurality of capture images in the image processing unit 160 to be explained hereinbelow. Herein, in the case where there is an unnecessary area in the combined capture image, an image from which the unnecessary area has been removed may be stored in the storage unit 130.

In addition, the storage unit 130 may store the generated print image. More specifically, the storage unit 130 may store the print image generated in the image processing unit 160 to be explained hereinbelow.

Moreover, the storage unit 130 may store a default viewport of the web browser. Herein, the default viewport is a pixel count displayed on the user interface unit 120 in a case where there is no additional viewport set on the web page. Default width pixel count per web browser is illustrated in FIG. 2. For example, when the web browser is android, the default width pixel count is 800, and thus the user interface unit 120 may display 800 pixel width of the web page on one screen.

The storage unit 130 may be embodied as a storage medium inside the mobile apparatus 100 and outer storage medium, for example, a removable disk including a universal serial bus (USB), and web server through network.

A size obtaining unit 140 obtains a size of the selected web page. More specifically, when the web browser installed in the mobile apparatus 100 has a size calculation API (Application Programming Interface), the size obtaining unit 140 may obtain a width or height value of the selected web page using the size calculation API. When the selected web page is expanded or reduced and displayed, the size obtaining unit 140 may obtain an actual pixel size of the selected web page in proportion to the expansion/reduction ratio.

When the web browser installed in the mobile apparatus 100 does not have a size calculation API, the size obtaining unit 140 may obtain the size of the selected web page using a Javascript function. More specifically, the size obtaining unit 140 may obtain the width and height value of the web page, and obtain the size of the selected web page using the Javascript function which enables the obtained width and height value to be stored in a cookie of the web browser. Such a Javascript function may obtain the width and height value using 'document.body.clientHeight' and 'document.body.clientWidth' which are separate Javascript functions that could obtain the width and height value of the web page. The width and height value obtained through the Javascript may be converted into the actual pixel size considering the expansion/reduction ratio and viewport.

Although an embodiment explained the case of obtaining the width and height value of the web page using 'document.body.clientHeight' and 'document.body.clientWidth', this is merely an example. That is, functions such as 'document.body.scrollHeight' or 'document.body.offsetHeight' can obviously be used, but all Javascript functions that could obtain the width and height value of the web page can obviously be used in the size obtaining unit.

A calculating unit 150 calculates a plurality of capture areas regarding the web page in such a manner that there is no repeated area, based on the size of the obtained web page. More specifically, the calculating unit 150 may divide the web page into a plurality of capture areas by a predetermined capture size so that there is no repeated area, and calculate x, y coordinates per divided capture area. Herein, the predetermined capture size is the size of the web page area which can be displayed in the user interface unit when displaying the web page without any expansion. In an example where the displayed web page is a mobile web page, the width of the mobile web page is suited to the width of the user interface window, and thus the calculating unit 150 may divide the web page into a plurality of capture areas with only a y coordinate.

The image processing unit 160 generates a capture image regarding the web page per calculated plurality of capture areas. More specifically, the image processing unit 160 may control so that the calculated plurality of capture areas are displayed consecutively on the user interface unit, and capture the screen displayed consecutively, to generate the capture image. More specifically, in a case where the web browser installed in the mobile apparatus 100 has a scrolling API, the image processing unit 160 may control so that the calculated plurality of capture areas are displayed consecutively on the user interface unit 120 using the scrolling API, and perform an operation of obtaining the screen stored in the display data buffer, to generate a capture image. As such, in that the image processing unit 160 according to this exemplary embodiment obtains the screen stored in the display data buffer and generates a capture image, it becomes able to perform a capture operation in a browser which does not have a capture API.

In an example where the web browser installed in the mobile apparatus 100 does not have a scrolling API, the image processing unit 160 may control so that the plurality of capture areas are displayed consecutively on the user interface unit 120 using the Javascript function such as 'scrollTo', and generate a plurality of capture images.

Figure 6:
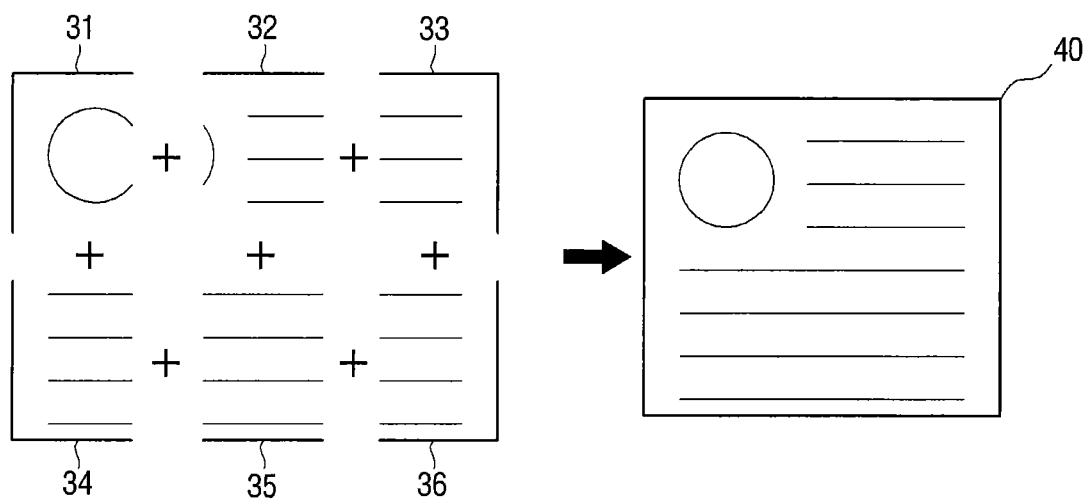

In addition, the image processing unit 160 combines the generated capture images. More specifically, the image processing unit 160 may generate one capture image by combining the captured plurality of capture images in such a manner that they each correspond to the area location of each capture image. The combined capture image may or may not have an unnecessary area. For example, in a case where the web page is divided as in FIG. 3 or FIG. 4, the combined capture image does not have an unnecessary area. Therefore, as illustrated in FIG. 6, the image processing unit 160 may output the combined capture image as a print image without additional image processing.

Figure 7:
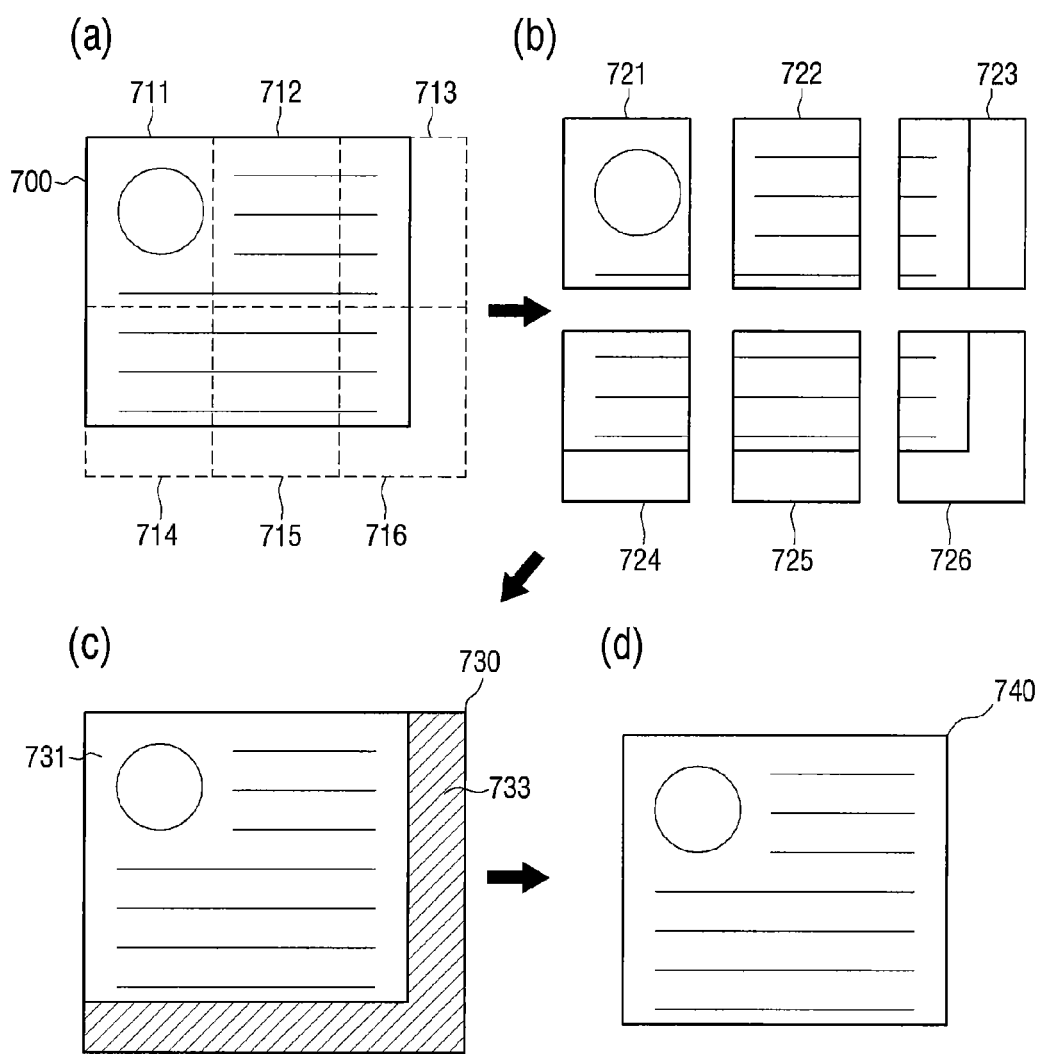

However, when the web page is divided as in FIG. 7, the combined capture image has an unnecessary area which does not correspond to the web page. Therefore, the image processing unit 160 may cut out an area which does not correspond to the size of the web page from the combined image, and generate a print image.

In addition, the image processing unit 160 may perform at least one processing from among expansion processing, reduction processing, and dividing processing according to the size of the paper which received the combined image, and generate a print image. More specifically, the image processing unit 160 may edit the combined capture image based on the information on the paper size and layout command received from the user, and generate a print image.

Figure 8:
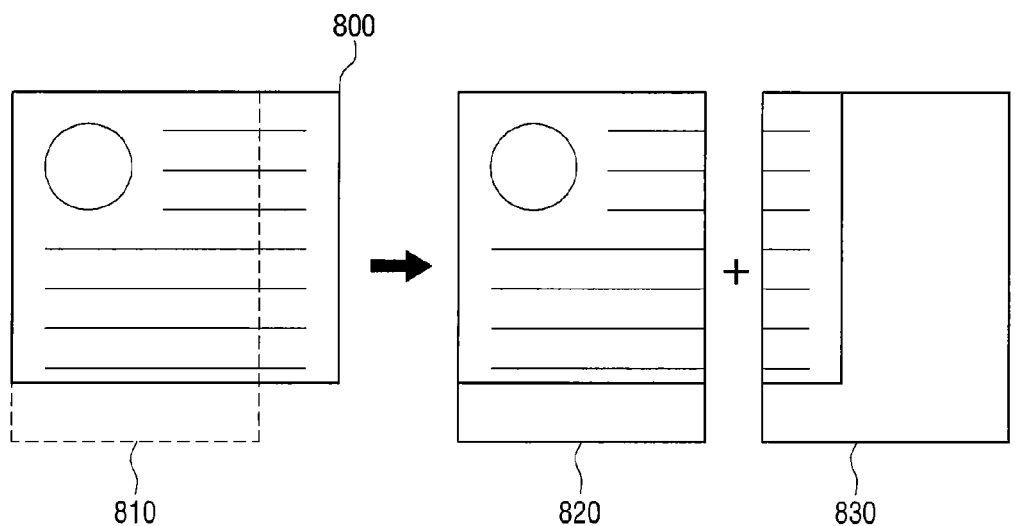

For example, in a case where the size of the paper input by the user is A4, and the width of the combined capture image is greater than the width of A4 as illustrated in FIG. 8, the image processing unit 160 may divide the combined capture image and generate two print images. Otherwise, in a case where the size of the paper input by the user is A4, and where the user input a layout command to suit the width of the web page to the size of the paper, the image processing unit 160 may reduce the combined capture image and generate a print image as in FIG. 9.

A controlling unit 170 controls each configuration inside the mobile apparatus 100. More specifically, when a web page to be printed is selected through the user interface unit 120, the controlling unit 170 may control the size obtaining unit 140 so that the size of the selected web page is obtained. In addition, when the size of the web page is obtained, the controlling unit 170 may control the calculating unit 150 so that a plurality of capture areas are calculated, and control the image processing unit 160 so that capturing of the calculated plurality of capture areas is performed.

In addition, the controlling unit 170 may control the image processing unit 160 so that a final print image which corresponds to the size of the paper predetermined by the user is generated. In addition, the controlling unit 170 may control the communication interface unit 110 so that the generated print image is transmitted to the image forming apparatus 10.

Therefore, in that the mobile apparatus 100 according to this exemplary embodiment calculates the area to be captured and generates a capture image prior to performing the capture operation, it is unnecessary to perform additional processing of cutting out the repeated area regarding the capture image, thereby improving the print processing time. In addition, in that the area to be captured is calculated in advance, capturing can be performed promptly. Moreover, the mobile apparatus 100 according to this exemplary embodiment may perform capture operation regarding the web page even in a web browser which does not have a capture API and scrolling API.

In explaining FIG. 1, the size obtaining unit 140, calculating unit 150, image processing unit 160, and controlling unit 170 were explained to be separate configurations, but they can be embodied as one configuration where the aforementioned functions are combined.

Figure 3:
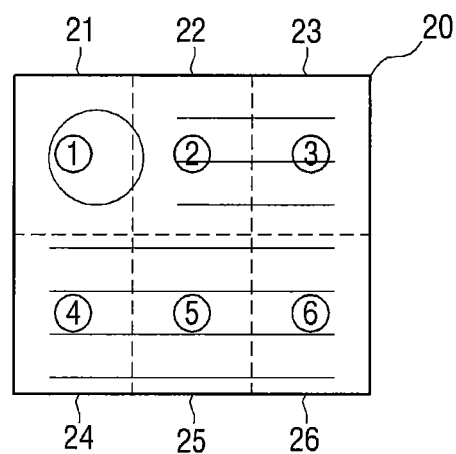
FIGS. 3 and 4 are views for explaining operations of a calculating unit of FIG. 1.
Figure 4:
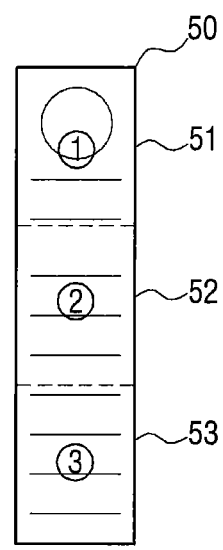

FIGS. 3 and 4 are views for explaining the operations of the calculating unit of FIG. 1.

More specifically, FIG. 3 is a view for explaining the operation of calculating a plurality of capture areas regarding a general web page. In addition, FIG. 4 is a view for explaining the operations of calculating a plurality of areas regarding a mobile web page.

The calculating unit 140 calculates the plurality of capture areas to be the predetermined size so that there is no repeated area, based on the obtained size of the web page 20. Therefore, the web page 20 such as FIG. 3 is divided into a plurality of capture areas 21, 22, 23, 24, 25, 26 so that there is no repeated area.

In an example of the mobile web page, the width of the web page is suited to the width of user interface window 50, and thus is divided into a plurality of capture areas 51, 52, 53 of vertical directions so that there is no repeated area.

FIGS. 5 to 11 are views for explaining operations of the image processing unit of FIG. 1.

Figure 5:
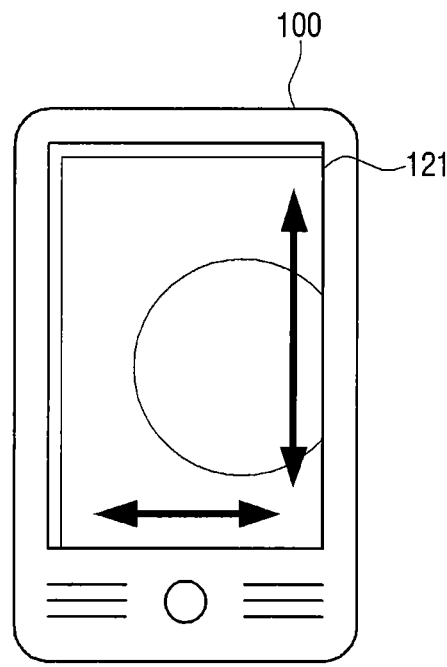
FIGS. 5 to 11 are views for explaining operations of an image processing unit of FIG. 1.

More specifically, FIG. 5 is a view for explaining the capture operations of the image processing unit 160.

With reference to FIG. 5, the image processing unit 160 may have a first capture area to be displayed on the user interface window 121, and perform capturing regarding the first capture area, to generate a first capture image. In addition, the image processing unit 160 may scroll the web page vertically or horizontally and have a second capture area displayed on the user interface window 121, and perform capturing regarding the second capture area to generate a second capture image. In addition, the image processing unit 160 may perform this process to all capturing areas, and generate a plurality of capture images regarding the web page.

FIGS. 6 and 7 are views for explaining the operation of combining the plurality of capture images generated.

With reference to FIG. 6, the web page 20 as in FIG. 3 is divided into six capture areas 21, 22, 23, 24, 25, 26, and thus six capture images 31, 32, 33, 34, 35, 36 are generated as in FIG. 6. Therefore, the image processing unit 160 may combine the six capture images 31, 32, 33, 34, 35, 36 to correspond to the capture areas, and generate one capture image 40.

With reference to FIG. 7, the web page 700 as in FIG. 7a is divided into six capture areas 711, 712, 713, 714, 715, 716, and thus six capture images 721, 722, 723, 724, 725, 726 are generated as in FIG. 7b. Therefore, the image processing unit 160 may combine the six capture images 711, 722, 723, 724, 725, 726 to correspond to the capture areas, and generate the capture image 730 as in FIG. 7c. However, in the capture image 730, there exists an unnecessary area 733 which has nothing to do with an area 731 of the web page unlike in FIG. 6, and thus the image processing unit 160 may cut out the area 733 which does not correspond to the size of the web page on the capture image 730, and generate one capture image 740 as in FIG. 7d.

The capture image generated by FIGS. 6 and 7 can be directly used as a print image, but in a case where information of the size of the paper or layout information has been received from the user, the image processing unit 160 may image process one capture image generated, and generate a print image.

FIGS. 8 to 11 are views for explaining operations of generating a print image in the image processing unit 160.

With reference to FIG. 8, in the case where the size of the paper input by the user is A4 810, and the width of the combined capture image 800 is greater than the width of A4, the image processing unit 160 may divide the combined capture image 800, and generate two print images 820, 830.

Figure 9:
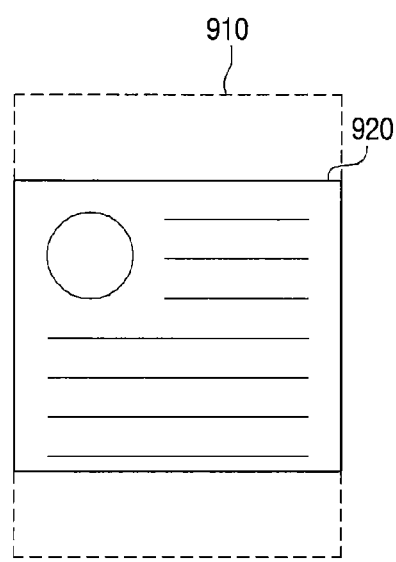

With reference to FIG. 9, in the case where the user input a layout command to suit the width of the web page in addition to the condition as in FIG. 8, the image processing unit 160 may reduce the combined capture image 800 (reduced combined capture image 920), and generate one print image 910 of A4 size.

Figure 10:
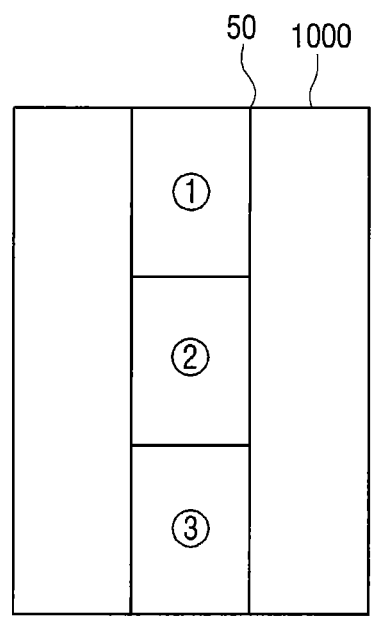

With reference to FIG. 10, in the case where the user input a print command regarding the mobile web page and input the size of the paper to be A4, and a layout command that the location of the web page is the center, the image processing unit 160 may generate a print image 1000 where one combined capture image is located in the center of A4.

Figure 11:
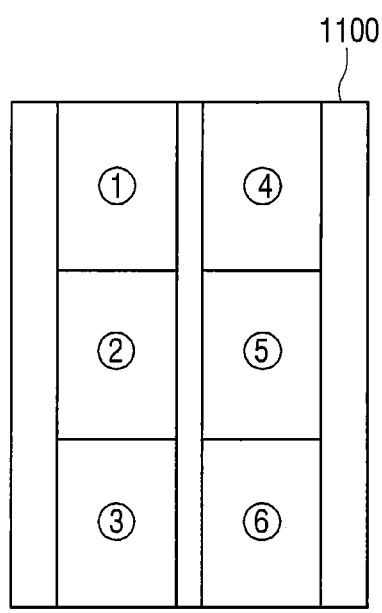

With reference to FIG. 11, in the case where the user input a print command regarding the mobile web page and input the size of the paper to be A4 and input a 2-up layout command to the web page, the image processing unit 160 may divide the one combined capture image into two, and generate a print image 1100 where two divided capture images are located in A4.

Figure 12:
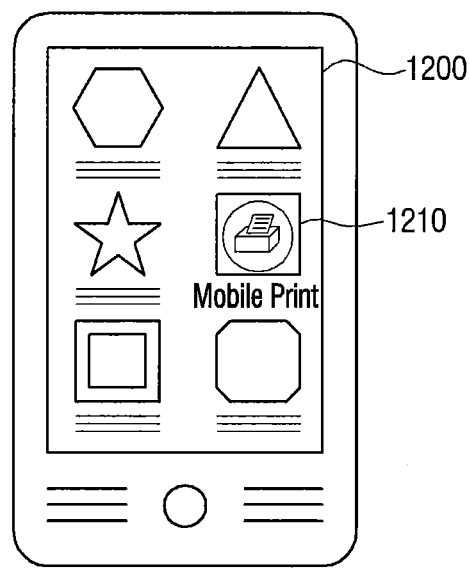
FIGS. 12 to 14 are views illustrating various examples of a user interface window which can be displayed on a mobile apparatus of FIG. 1.
Figure 13:
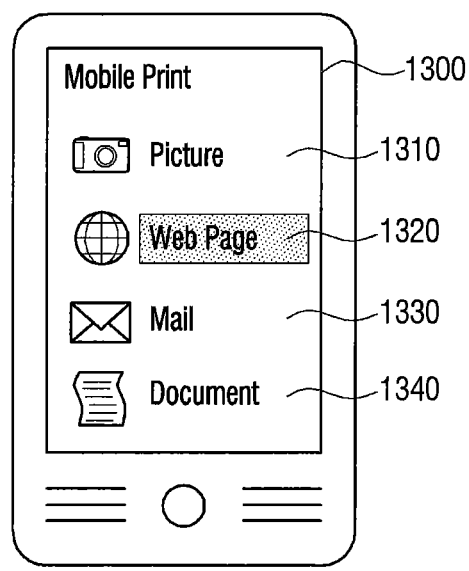
Figure 14:
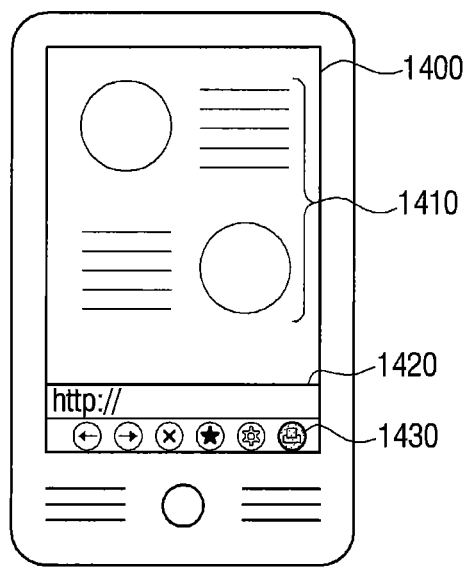

FIGS. 12 to 14 are views illustrating various examples of the user interface window which can be displayed in the mobile apparatus of FIG. 1.

With reference to FIG. 12, the user interface window 1200 displays an area 1210 for receiving a print command in an icon format. In the case where the user selected the area 1210, a user interface window 1300 such as FIG. 13 may be displayed.

With reference to FIG. 13, the user interface window 1300 displays various areas 1310, 1320, 1330, 1340 for receiving the printing objects in icon formats.

A picture area 1310 is an area for receiving a command for printing an image stored in the mobile apparatus 100. When the picture area 1310 is selected, the mobile apparatus 100 may display the image stored in the mobile apparatus 100 and may be selected with the image where print operation is to be performed from among the displayed images. The selected image may be transmitted to the image forming apparatus 10 by the direct printing method and be printed.

The web page area 1320 is an area for receiving a command to print the web page. When the web page area 1320 is selected, a user interface window 1400 such as FIG. 14 may be displayed.

A mail area 1330 is an area for receiving a command for printing a mail. When the mail area is selected, the mobile apparatus 100 may display the received mail and be selected with the mail where printing operation is to be performed from among the displayed mails. The selected mail may be imaged, and the imaged mail may be transmitted to the image forming apparatus 10 and be printed. Otherwise, the selected mail file itself may be transmitted to the image forming apparatus 10 and be printed.

A document area 1340 is an area for receiving a command for printing a document file. When the document area 1340 is selected, the mobile apparatus 100 may display a document file stored in the mobile apparatus 100, and be selected with a document file where printing operation is to be performed from among the displayed documents files. The selected document file may be transmitted to the image forming apparatus 10 by the direct printing method and be printed.

With reference to FIG. 14, the user interface window 1400 may include a first area 1410, a second area 1420, and a third area 1430.

The first area 1410 is an area for displaying a web page selected through a second area 1420.

The second area 1420 is an area selected with the web page to be printed.

A third area 1430 is an area for receiving a capture command or print command regarding the web page displayed on the first area 1410.

Figure 15:
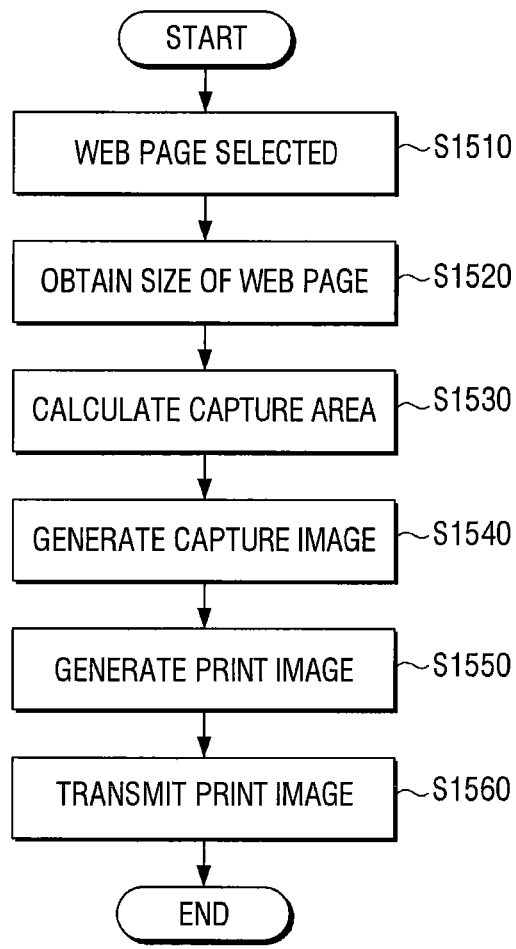
FIG. 15 is a flowchart for explaining a print controlling method in a mobile apparatus according to an embodiment.

FIG. 15 is a flowchart for explaining a print controlling method in a mobile apparatus according to an embodiment.

With reference to FIG. 15, first of all, a web page to be printed is selected S1510. More specifically, a web page address may be received on the user interface window, and the web page to be printed may be selected. It may be embodied to input the print command regarding the web page displayed through the web browser, and select the web page to be printed.

In addition, the size of the selected web page is obtained S1520. More specifically, in the case where the web browser installed in the mobile apparatus 100 has a size calculation API (Application Programming Interface), the width and height of the selected web page may be obtained using the size calculation API. In an example where the web browser installed in the mobile apparatus 100 does not have a size calculation API, the size of the selected web page may be obtained using the Javascript function.

In addition, based on the obtained size of the web page, a plurality of capture areas regarding the web page is calculated in such a manner that there is no repeated area S1530. More specifically, it is possible to divide the web page into a plurality of capture areas by a predetermined capture size so that there is no repeated area, and calculate x, y coordinates per divided capture area. In an example where the displayed web page is a mobile web page, the width of the mobile web page is suited to the width of the user interface window, and thus it is possible to divide the web page into a plurality of capture areas with only y coordinates.

In addition, a capture image regarding the web page is generated per calculated plurality of capture areas S1540. More specifically, it may be controlled so that the calculated plurality of capture areas are displayed consecutively on the user interface unit, and that the screen displayed consecutively is captured to generate a capture image. More specifically, in the case where the web browser installed in the mobile apparatus 100 has a scrolling API, the calculated plurality of capture areas may be displayed on the user interface window consecutively using the scrolling API, and the screen displayed consecutively may be captured to generate a capture image. When the web browser installed in the mobile apparatus 100 does not have a scrolling API, a plurality of capture areas may be displayed on the user interface unit consecutively using the Javascript such as 'scrollTl' to generate a plurality of capture images.

In addition, the generated capture images are combined to generate a print image S1550. More specifically, the plurality of capture images can be combined in such a manner that they correspond to the area location of each capture image. The combined capture image may or may not have an unnecessary area. Therefore, in the case where there is an unnecessary area, an area that does not correspond to the size of the web page from among the one combined capture image (that is, the unnecessary area) may be cut out and generate a print image. In an example where the information of the size of the paper and the layout command have been received from the user, an image processing such as expansion processing, reduction processing and dividing processing may be performed regarding the combined capture image based on the received information of the size of the paper and the layout command, to generate a print image.

In addition, the generated print image is transmitted to the image forming apparatus S1560. More specifically, the generated print image may be transmitted to the image forming apparatus so that the generated print image can be printed in a direct printing method.

Figure 16:
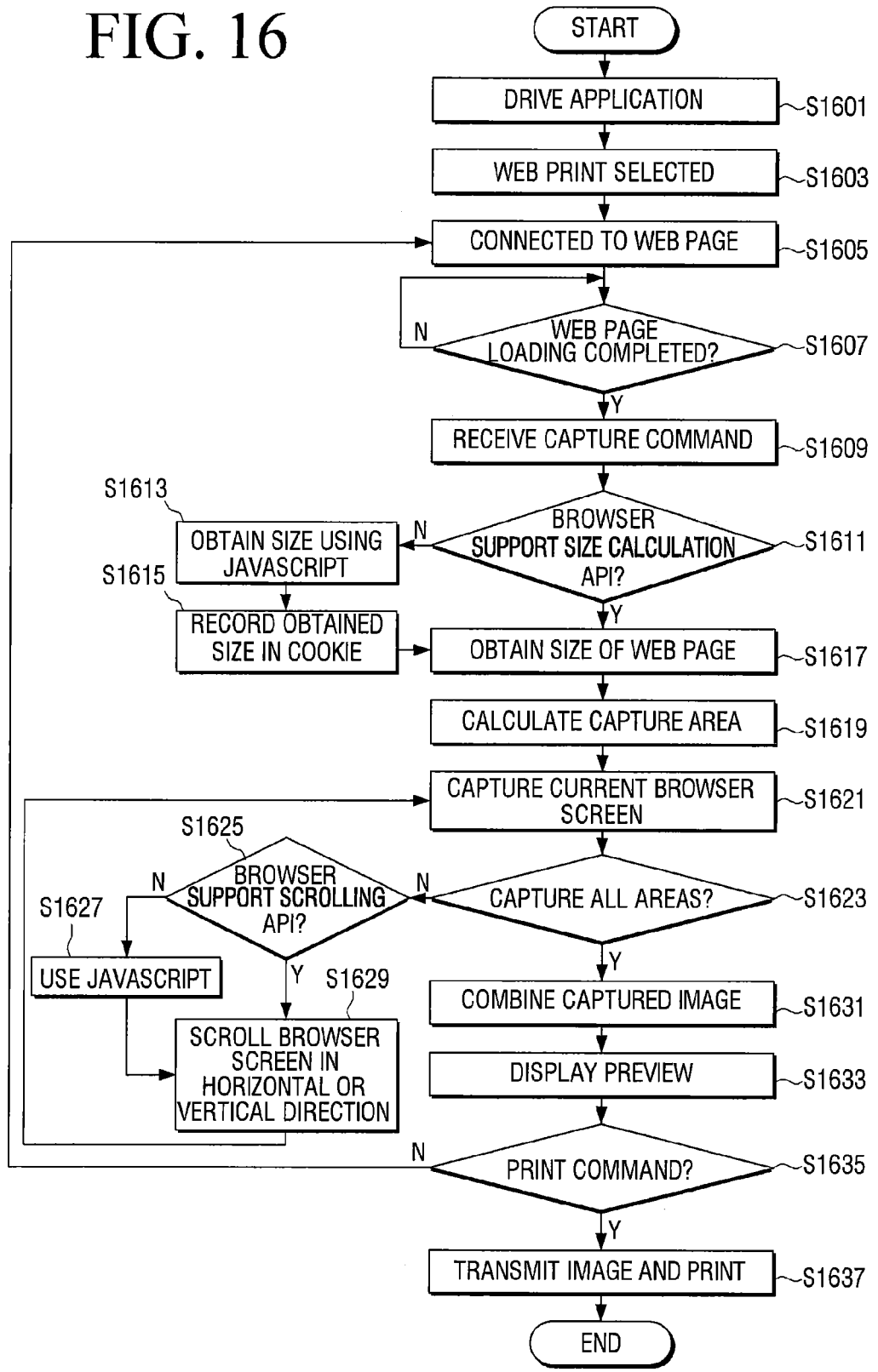
FIG. 16 is a flowchart which specifically illustrates operations of FIG. 15.

FIG. 16 is a flowchart specifically illustrating operations of FIG. 15.

With reference to FIG. 16, an application is driven S1601. More specifically, as illustrated in FIG. 12, when a mobile print icon 1210 is selected, the application which performs a print control operation is driven as aforementioned.

In addition, a web print is selected S1603. More specifically, when the application which performs a print control operation is driven, a user interface window 1300 such as FIG. 13 is displayed, and when a web page area 1320 is selected in the displayed user interface window, the user interface window 1400 as in FIG. 14 is displayed, and a web page to be printed on the second area 1420 of the displayed user interface window 1400 may be selected.

In addition, the selected web page is connected S1605. More specifically, when the web page to be printed is selected on the second area 1420, the selected web page may be loaded, and the loaded web page may be displayed on the first area 1410.

When the loading of the web page is completed S1607, a capture command regarding the corresponding web page is received from the user S1609. More specifically, when the web page is loaded on the first area 1410, a third area 1430 is selected by the user, and a capture command regarding the corresponding web page may be received.

When the capture command is received, it is determined whether or not the web browser has a size calculation API S1613, and when the web browser does not have a size calculation API S1611—No, the size of the web page is calculated using the Javascript S1613, the calculated size of the web page may be recorded in the cookie S1615, and the size of the web page recorded in the cookie may be obtained to obtain the size of the web page S1617. When the web browser does have a size calculation API S1611—Yes, the size of the web page may be obtained using the size calculation API S1617.

When the size of the web page is obtained, the plurality of capture areas regarding the web page are calculated in such a manner that there is no repeated area based on the obtained size of the web page S1619.

When the plurality of capture areas are calculated, the user interface window currently displayed is captured S1621, and it is determined whether or not all capture areas are captured S1623.

When not all capture areas are captured S1623—No, it is determined whether or not the web browser has a scrolling API S1625, and when the web browser does have a scrolling API, the user interface window which corresponds to a next capture area is displayed using the scrolling API S1629, and when the web browser does not have a scrolling API, the user interface window which corresponds to the next capture area may be displayed using the Javascript S16127, S1629.

In the case where all capture areas are captured S1623—Yes, the plurality of capture images are combined to generate a print image S1631.

In addition, the generated print image is displayed as a preview image S1633. The user may input a final print command regarding the corresponding web page through the displayed preview image.

When the print command is input from the user S1635—Yes, the generated print image may be transmitted to the image forming apparatus to perform a print operation S1637. If a print command is not input by the user S1635—No, the aforementioned operation may be repeated.

Therefore, the print control method according to an embodiment improves the print processing time in that the area to be captured is calculated in advance to generate the capture image before performing the capture operation, and thus it is needless to perform an additional processing of cutting out the repeated area regarding the capture image. In addition, in that the area to be captured is calculated in advance, it is possible to perform a capturing operation promptly. Moreover, it becomes able to perform a capture operation on the web page even in a web browser which does not have a capture API and a scrolling API. Print controlling method as in FIGS. 15 and 16 can be performed in a mobile apparatus having the configuration of FIG. 1, and also in a mobile apparatus having other configurations.

Print controlling processes, functions, methods, and/or software in mobile apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA.

Therefore, each block may be carried out as computer recordable codes on a recording medium readable by a computer. A computer readable recording medium may be a device which can store data which can be read by a computer system.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A mobile apparatus connectible to an image forming apparatus and internet, the mobile apparatus comprising:
   a user interface which selects a web page to be printed;
   at least one hardware processor configured to:
   obtain a size of the selected web page;
   calculate a plurality of web page areas to be captured in such a manner that there is no repeated area, based on the obtained size of the web page; and
   generate at least one captured image of the web page based on the calculated plurality of web page areas to be captured, and combines generated capture images to generate a print image; and
   a communication interface which transmits the generated print image to the image forming apparatus,
   wherein the at least one hardware processor controls so that each of the calculated plurality of web page areas to be captured are displayed consecutively on the user interface, and generates a screen displayed consecutively as one captured image, and
   wherein the plurality of web page areas displayed consecutively on the user interface include no repeated area.

2. The mobile apparatus according to claim 1, wherein the at least one hardware processor obtains the size of the web page using a size calculation API (Application Programming Interface) of a web browser which displays the web page.

3. The mobile apparatus according to claim 1, wherein the at least one hardware processor obtains the size of the selected web page using a Javascript function.

4. The mobile apparatus according to claim 1, wherein the at least one hardware processor divides the web page into the plurality of web page areas to be captured by a predetermined capture size in such as manner that there is not repeated area, and calculates x, y coordinates per divided web page area to be captured.

5. The mobile apparatus according to claim 4, wherein the predetermined capture size is a size of the web page which can be displayed in the user interface in the case of displaying the web page without any expansion.

6. The mobile apparatus according to claim 1, wherein the at least one hardware processor controls so that each of the plurality of web page areas to be captured are displayed consecutively on the user interface using the Javascript function, to generate the plurality of captured images.

7. The mobile apparatus according to claim 1, wherein the user interface is configured to display the web page according to a control of a web browser installed in the mobile apparatus, and the web browser does not have a capture API.

8. A print controlling method in a mobile apparatus connectible to an image forming apparatus and internet, the print controlling method comprising:
selecting a web page to be printed;
obtaining a size of the selected web page;
calculating a plurality of web page areas to be captured so that there is no repeated area, based on the obtained size of the web page;
generating at least one captured image of the web page based on calculated plurality of web page areas to be captured;
combining the generated captured images to generate a print image; and
transmitting the generated print image to the image forming apparatus,
wherein the generating the at least one captured image controls so that each of the calculated plurality of web page areas to be captured are displayed consecutively on the user interface unit, and generates a screen displayed consecutively as one captured image, and
wherein the plurality of web page areas displayed consecutively on the user interface include no repeated area.

9. The print controlling method according to claim 8, wherein the obtaining the size obtains the size of the web page using a size calculation API (Application Programming Interface) of a web browser which displays the web page.

10. The print controlling method according to claim 8, wherein the obtaining the size obtains the size of the selected web page using a Javascript function.

11. The print controlling method according to claim 8, wherein the calculating divides the web page into the plurality of web page areas to be captured by a predetermined capture size in such a manner that there is no repeated area, and calculates x, y coordinates per divided web page area to be captured.

12. The print controlling method according to claim 11, wherein the predetermined capture size is a size of a web page area which can be displayed in the user interface unit in the case of displaying the web page without any expansion.

13. The print controlling method according to claim 8, wherein the generating the captured image controls so that each of the plurality of web page areas to be captured are displayed consecutively on the user interface unit using the Javascript function to generate the plurality of capture images.

14. A non-transitory computer readable recording medium which includes a program for executing a print controlling method in a mobile apparatus connectible to an image forming apparatus and internet, the print controlling method comprising:
selecting a web page to be printed;
obtaining a size of the selected web page;
calculating a plurality of web page areas to be captured so that there is not repeated areas, based on the obtained size of the web page;
generating at least one captured image of the web page based on calculated plurality of web page areas to be captured;
combining the generated captured images to generate a print image; and
transmitting the generated print image to the image forming apparatus,
wherein the generating the at least one captured image controls so that each of the calculated plurality of web areas to be captured are displayed consecutively on the user interface unit, and generates a screen displayed consecutively as one captured image, and
wherein the plurality of web page areas displayed consecutively on the user interface include no repeated area.

15. The non-transitory computer readable recording medium according to claim 14, wherein the obtaining the size obtains the size of the web page using a size calculation API (Application Programming Interface) of a web browser which displays the web page.

16. The non-transitory computer readable recording medium according to claim 14, wherein the obtaining the size obtains the size of the selected web page using a Javascript function.

17. The non-transitory computer readable recording medium according to claim 14, wherein the calculating divides the web page into the plurality of web page areas to be captured by a predetermined capture size in such a manner that there is no repeated area, and calculates x, y coordinates per divided web page area to be captured.

18. The non-transitory computer readable recording medium according to claim 17, wherein the predetermined capture size is a size of a web page area which can be displayed in the user interface unit in the case of displaying the web page without any expansion.

19. The non-transitory computer readable recording medium according to claim 14, wherein the generating the captured image controls so that each of the plurality of web page areas to be captured are displayed consecutively on the user interface unit using the Javascript function to generate the plurality of captured images.

20. The non-transitory computer readable recording medium according to claim 14, wherein the generating the print image combines the generated plurality of captured images to correspond to the web page area to be captured, and cuts out an area that does not correspond to the size of the web page, to generate a print image.

21. The mobile apparatus according to claim 1, wherein the user interface is configured to display the web page according to a control of a web browser installed in the mobile apparatus, and the mobile apparatus does not have a capture API.

* * * * *